United States Patent [19]

Ilmer

[11] 4,348,692

[45] Sep. 7, 1982

[54] VTR WITH EQUALIZER

[75] Inventor: Andreas Ilmer, Ludwigshafen, Fed. Rep. of Germany

[73] Assignee: BASF Aktiengesellschaft, Ludwigshafen, Fed. Rep. of Germany

[21] Appl. No.: 129,838

[22] Filed: Mar. 13, 1980

[30] Foreign Application Priority Data

Dec. 17, 1979 [DE] Fed. Rep. of Germany ....... 2950764

[51] Int. Cl.³ ............................................. H04N 5/76
[52] U.S. Cl. ..................................... 358/127; 360/65; 360/33; 358/8
[58] Field of Search ..................... 358/8, 31, 127, 166, 358/177, 167, 37; 360/65, 67, 68, 33, 26, 25; 333/28 R, 18, 14; 455/43

[56] References Cited

U.S. PATENT DOCUMENTS

| | | | |
|---|---|---|---|
| 3,122,716 | 2/1964 | Whang | 333/28 R |
| 3,340,367 | 9/1967 | Coleman | 360/65 |
| 3,518,581 | 6/1970 | Hughes | 333/28 R |
| 3,564,123 | 2/1971 | Pezirtzoglov | 358/4 |
| 3,728,475 | 4/1973 | Inoue | 360/65 |
| 3,800,265 | 3/1974 | Yoshioka | 333/28 R |
| 3,868,604 | 2/1975 | Tongue | 333/28 R |
| 4,071,782 | 1/1978 | Vidovic | 333/28 R |
| 4,140,983 | 2/1979 | Tamori | 333/18 |
| 4,200,889 | 4/1980 | Strobele | 360/65 |

OTHER PUBLICATIONS

Rundfunktechnische Mitteilungen, vol. 1, 1957 pp. 151–158.

*Primary Examiner*—Bernard Konick
*Assistant Examiner*—Alan Faber
*Attorney, Agent, or Firm*—Keil & Witherspoon

[57] ABSTRACT

Equalizer circuitry for a wideband signal recording/playback system, in particular a home video system, comprises a pre-emphasis and a de-emphasis circuit in the recording channel and the playback channel respectively. In an advantageous embodiment, the pre-emphasis and de-emphasis circuits are of the second-order type. In the preferred embodiment of the circuitry, in each of said channels there is provided a circuit for group-delay equalization, preferably an all-pass filter which comprises at least one substantially symmetrical transistor stage provided with a bridge circuit consisting of at least one reactive impedance and ohmic resistance and located between emitter and collector. Practical embodiments of the bridge circuit comprise several series-connected parallel LC sections and one ohmic resistance. Advantageously, conventional filter stages in the channels may be at least partially included in said circuit for group-delay equalization. Conventional delay means provided in color video systems for equalization of the delay between color and video signals can therefore be integrated in said circuit for group-delay equlization.

2 Claims, 11 Drawing Figures

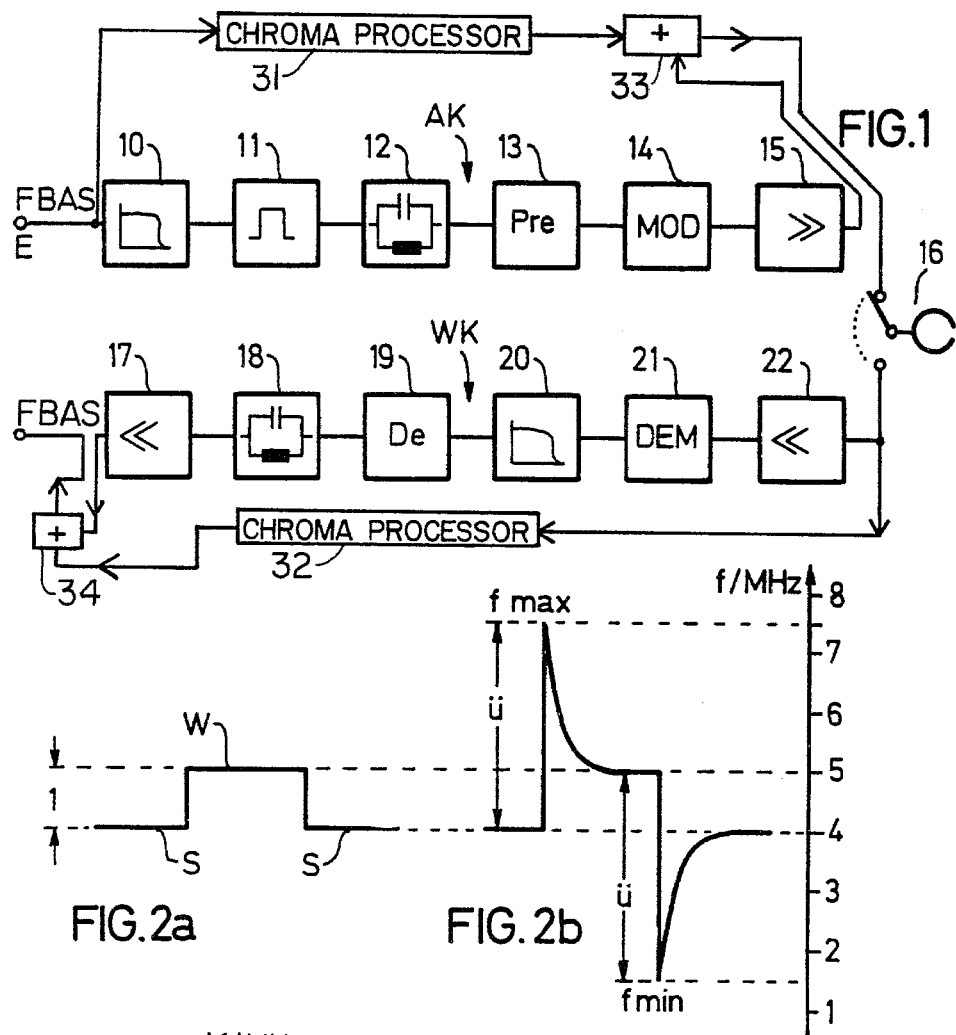
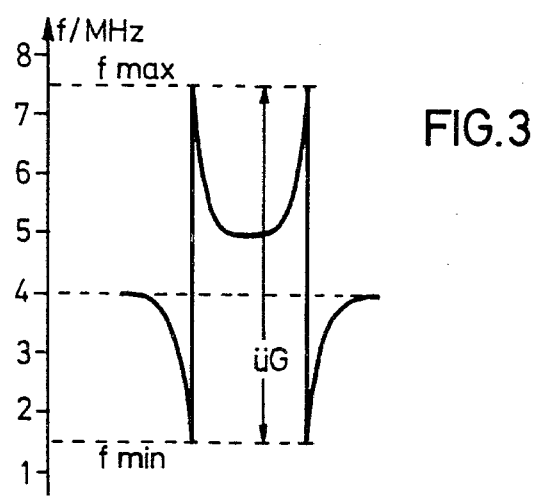

VTR WITH EQUALIZER

BACKGROUND OF THE INVENTION

The present invention relates to an arrangement for equalizing a wide-band signal, particularly a video signal with or without chrominance information, in a signal recording/playback system.

To improve the signal/noise ratio, such systems normally make use of pre-emphasis/de-emphasis techniques.

If a conventional pre-emphasis circuit is used in front of, for example, a frequency modulator, the amount of pre-emphasis (emphasis of the high frequencies in the signal) to be set is limited by the fact that the maximum frequency-modulated momentary frequency at the output of the frequency modulator should be within the recording range of the recording medium and the minimum frequency should just fail to generate a Moiree pattern due to image formation by the frequency-modulated signal at the zero line. Other interferences which further reduce the gains made in the signal/noise ratio, should also be avoided.

Objects of the Invention and Preferred Embodiments of the Invention

It is an object of the present invention to increase the signal/noise ratio further without overmodulating the signal transmission channel. A further object is to improve the resolution of the played-back signals.

This object is achieved by means of an arrangement for equalizing a wide-band signal, particularly a video signal with or without chrominance information, in a signal recording/playback system, wherein, in addition to the pre-emphasis circuit and the de-emphasis circuit in the recording channel and the playback channel respectively, a circuit is provided for group-delay equalization for the wide-band signal in each channel.

In this way the respective wide-band or video signal is given such a form that it is possible to increase the pre-emphasis without running the risk of the modulated signal exceeding the bandwidth of the magnetic tape. This makes the invention particularly advantageously applicable to narrow-band video recording/playback systems.

It is considered to be a further advantage that, apart from the gains achieved in the signal/noise ratio, an improvement in signal resolution is obtained.

Prior Art

It is basic knowledge to shorten transients, caused by phase distortion of a signal, or to make them symmetrical, by means of phase equalization filters (see, for example, Rundfunktechnische Mitteilungen, Volume 1, 1957, pages 151–158). Due to the large number and necessary precision of the required components, an extremely large amount of circuitry is involved, which is the reason why it has not been possible up to now to use such circuits, particularly for home video applications.

Further Preferred Embodiments of the Invention

The circuit for group-delay equalization is advantageously an all-pass filter which can comprise one or more essentially symmetrical transistor stages provided with a bridge circuit consisting of reactive impedance and ohmic resistance and located between emitter and collector. This gives a circuit which is very simple compared to conventional circuits.

In practice the group-delay equalization of the all-pass filter is effective over the entire transmission range of the recording/playback system, particularly in video systems from 0 to 3 MHz.

The all-pass filter advantageously consists essentially of several series-connected parallel LC sections as the reactive impedance and of one ohmic resistance. Commercially available components can be used for this.

In a further embodiment of the invention, the pre-emphasis (de-emphasis) circuit used is a second-order pre-emphasis (de-emphasis) circuit with a predetermined transfer function which is disclosed in the following text and in the claims.

This has the advantage that the all-pass filters can be realized with the minimum amount of circuitry.

It is also advantageous to incorporate those filter stages into the group-delay equalization characteristic which are in any case present in the recording/playback channels. It is also of advantage to match the delay of the all-pass filter to that of conventional delay equalization sections which are used, for example, for equalizing the delay in time which occurs between the chrominance and the luminance signals. This makes it possible to save such group-delay equalization delay means.

In the magnetic recording of wide-band signals, particularly of video signals, pre-emphasis techniques are used to improve the signal/noise ratio, ie. the signal levels of the higher frequency components in the signal spectrum are emphasized in accordance with a predetermined frequency response characteristic having the characteristic values which follow. The upper frequency limit is the highest frequency (for example, fg=3 MHz) of the transmission channel, for example of the video tape. The pre-emphasis filter is determined by the cut-off frequencies f1 and f2 (for example 250 KHz and 900 KHz) and the emphasizing factor Ü (for example 3.5). The amplitude/frequency response has a constant value below $f_1$, rises continuously, by the factor Ü, from $f_1$ to $f_2$ and remains constant again above $f_2$. Since the rise from $f_1$ to $f_2$ is linear in conventional pre-emphasis filters, in this case $Ü = f_2/f_1$. The values given in brackets refer to practical applications. As an approximation, the improvement obtained in the signal/noise ratio rises in proportion to the factor Ü but there are limits based on the increase in the latter, as explained below.

The critical case in this context occurs when the television image contains black/white or white/black transitions, according to FIGS. 2a, 2b and 3.

DRAWINGS

An embodiment of an arrangement according to the invention will now be described, by way of example, with reference to the accompanying drawings, in which FIG. 1 shows a block diagram of a recording/playback channel of a magnetic recording system;

FIGS. 2a and 2b show the signal curve of a black/white transition transferred by a conventional pre-emphasis circuit;

FIG. 3 shows the signal curve obtained through the group-delay equalization according to the invention;

Figure 5:
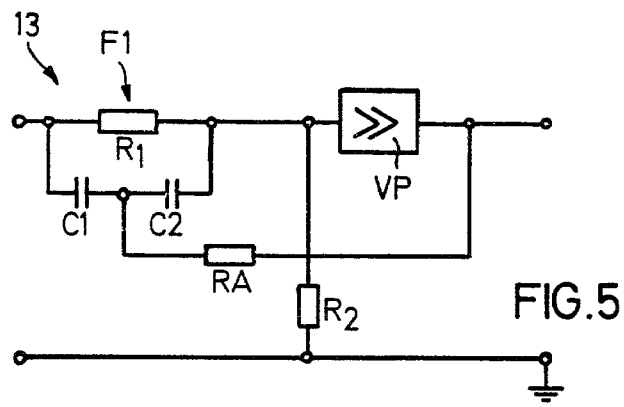
Figure 6:
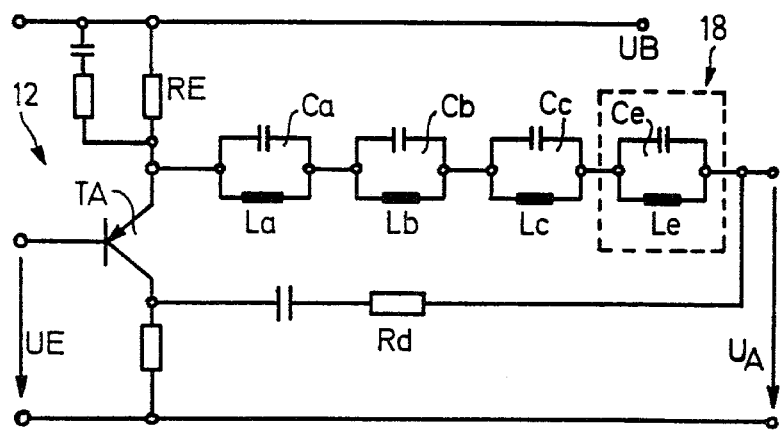
Figure 7:
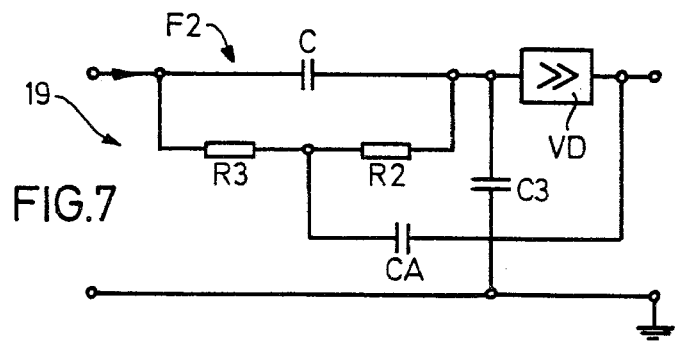

FIGS. 4a to d show characteristic curves of amplitude and group-delay frequency responses of pre-emphasis and de-emphasis filters including their frequency band-limiting filters;

FIG. 5 shows a circuit diagram of a pre-emphasis filter;

FIG. 6 shows a basic circuit of an equalizing stage in the recording channel according to FIG. 1; and FIG. 7 shows a circuit diagram of a de-emphasis filter.

Description of the Invention

The curve of the black/white transition is shown in FIG. 2a, and FIG. 2b shows the associated signal curve after a conventional pre-emphasis filter.

The pre-emphasis filter causes the transitions occurring in the signal to be amplified asymmetrically by approximately the factor Ü. Afterwards the voltage represented by the curve according to FIG. 2b is converted in the FM modulator into a frequency which is variable with time, for example in accordance with the frequency axis shown in FIGS. 2b and 3. The admissible emphasizing factor Ü is, therefore, given directly by the maximum and minimum frequencies which can be tolerated, $f_{max}$ being the maximum frequency to be transmitted via the transmission channel (in the case of magnetic tape, the highest frequency which can still be recorded and reproduced) (for example, 7.5 MHz in FIGS. 2b and 3), and $f_{min}$ being given by the permissible harmonic interference which increases as the $f_{min}$ frequency decreases.

By using a group-delay equalization in addition to the conventional pre-emphasis filter, the black/white transitions in FIG. 2a can be made symmetrical, according to the invention, as shown in FIG. 3. Because of the reduction in overshoot resulting from the symmetrization, it is thus possible, as shown in FIG. 3 to increase the emphasizing factor until the ensuing higher amount of overshoot has again reached the permissible limits represented by the frequencies $f_{max}$ and $f_{min}$; the corresponding higher emphasizing factor has been designated $Ü_G$ in FIG. 3.

FIGS. 2b and 3 produce the following relationship between Ü and $Ü_G$:

$$Ü_G = 2 Ü - 1$$

If the abovementioned value of 3.5 is substituted for Ü, a $Ü_G$ of 6 and a factor $Ü_G/Ü$ of 1.7=4.6 db is obtained; in practice, a value of from 4.0 to 4.3 db is measured which is an extremely large increase in the signal/noise ratio. In addition, use of the group-delay equalization results in maximum picture sharpness (resolution), with a given signal bandwidth, and a reduction in signal overshoot.

To obtain the symmetrical curve characteristic shown in FIG. 3, the group-delay equalization must be effective over the entire signal bandwidth (in the case of video recording on magnetic tape, from 0 to 3 MHz). It is also necessary to equalize the de-emphasis filter accordingly.

Figure 4:
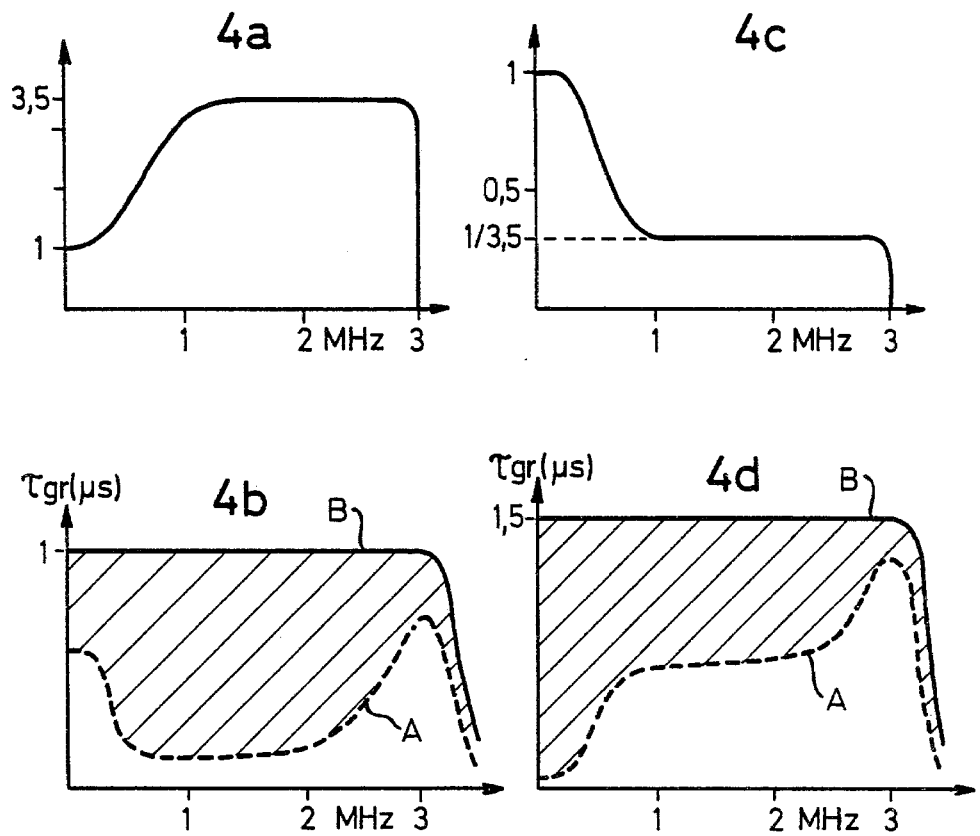

In FIG. 4, the amplitude and group-delay charactistics for pre-emphasis and de-emphasis filters are shown, including the respective input and output low-pass filter, without equalization (A) and with equalization (B) according to the present invention.

FIG. 4a shows the amplitude characteristic of the pre-emphasis filter,

FIG. 4c shows the amplitude characteristic of the de-emphasis filter,

FIG. 4b shows the group-delay characteristic of the pre-emphasis filter, and

FIG. 4d shows the group-delay characteristic of the de-emphasis filter.

The all-pass filters which are used for group-delay equalization must be designed in such a manner that the areas between the curves A and B, shown hatched in FIGS. 4b and d, are filled.

The block diagram in FIG. 1 for the channel of the luminance signal in a recording/playback system for video signals shows an embodiment of a circuit arrangement. Detail circuits of the filter arrangements are shown in FIGS. 5 to 7. In FIG. 1 the chroma channel has also been schematically indicated both on the recording side and on the playback side. On the recording side the chroma channel includes the chroma processor 31 and on the playback side the chroma processor 32. Adders 33 and 34 are provided to combine the outputs of the chroma and luma channels on the recording side and on the playback side, respectively.

Basically, the block diagram of the luminance recording channel AK, for example of a magnetic tape recording/playback apparatus (hereafter called R/P apparatus), contains blocks 10 to 15, starting from the input terminal E to which a composite color video signal is applied. The playback channel WK comprises blocks 17 to 22 and a magnetic recording/playback head (R/P head) 16 can be switched over between the channels AK and WK.

The input terminal E in the AK channel is followed by a low-pass filter 10 which limits the frequencies of the video signal (with or without chrominance component) to frequencies below, for example, 3 MHz (to remove the chrominance signal), and a clamping stage 11 which places the video signal at the correct DC level for the FM modulator 14. This is followed by the equalizing stage, as an all-pass filter 12, which is characterized by inductances and capacitances and an ohmic resistance Rd and which produces the group-delay equalization. This circuit is described in greater detail below. The output of the equalizing stage 12 is followed by a pre-emphasis filter 13 which is advantageously a second-order pre-emphasis filter. The transfer functions of this pre-emphasis filter 13 in the recording channel and of the de-emphasis filter 19 in the playback channel described below conform, respectively, to the following equations (1) and (2):

$$F_{Pre}(p) = K_{Pre} \frac{1 + 2D_1 \frac{p}{\omega_{G1}} + \left[\frac{p}{\omega_{G1}}\right]^2}{1 + 2D_2 \frac{p}{\omega_{G2}} + \left[\frac{p}{\omega_{G2}}\right]^2} \tag{1}$$

$$F_{De}(p) = K_{De} \frac{1 + 2D_2 \frac{p}{\omega_{G2}} + \left[\frac{p}{\omega_{G2}}\right]^2}{1 + 2D_1 \frac{p}{\omega_{G1}} + \left[\frac{p}{\omega_{G1}}\right]^2} \tag{2}$$

where:

$F_{Pre}(p)$, $F_{De}(p)$ are the two transfer functions for pre-emphasis and de-emphasis respectively;

$p = 2j\pi f$ is a complex angular frequency;

$K_{Pre}$, $K_{De}$ are constants;

$D_1$, $D_2$ are damping factors;

$\omega_{G1} = 2\pi f_{G1}$, $\omega_{G2} = 2\pi f_{G2}$ are the angular frequencies of cutoff frequencies $f_{G1}$ and $f_{G2}$.

In addition, the recording channel AK also contains a modulator 14, for example a frequency modulator, and a recording amplifier 15. In the playback channel WK, starting from the R/P head 16, a pre-amplifier 22, a demodulator 21 which corresponds to the type of modulator 14, a 3 MHz low-pass filter 20, a de-emphasis filter 19 which, as will have been noted, possesses the reciprocal transfer function of the pre-emphasis filter according to equation (1) and in which the positions of $D_1$ and $D_2$ and $\omega_{G1}$ and $\omega_{G2}$ have been interchanged, an equalizing stage, namely the all-pass filter 18, for equalizing the playback signal, and an output amplifier 17, which makes the composite video signal (with or without chrominance component, depending on the original signal) available for picture playback, are provided. The blocks 10, 12 and 13 and 18 to 20 in the channels AK and WK can theoretically be arranged in any order.

The all-pass filter 12 equalizes the group delay in the filters 10 and 13 and the all-pass filter 18 equalizes that of filters 19 and 20.

The low-pass filters 10 and 20 advantageously consist of suitable $\pi$-sections in which the series element is a parallel LC section and the shunt arms are capacitors.

According to FIG. 5, the pre-emphasis filter 13 is an amplifier stage $V_P$ having a frequency-dependent input stage F1 which consists of an RC combination with a symmetrical tap which is connected to the output of the amplifier $V_P$. The input stage F1 consists of the resistor R1 connected in parallel with the series-connected equal-sized capacitors C1 and C2, and the resistor $R_A$ which is connected symmetrically between C1 and C2 and goes to the output of stage $V_P$. Essentially, the input stage F1 generates the group-delay- and amplitude-dependent signal curve of FIGS. 4b and 4a, and must be dimensioned accordingly.

Whereas the pre-emphasis filter 13 is intended to accentuate the high signal frequencies linearly, for example from 875 KHz to 3 MHz, according to FIG. 4a, the de-emphasis filter 19 is intended to attenuate the signal frequencies correspondingly so that the signal is reproducible without distortion but with a greater signal/noise ratio. For this reason, the de-emphasis filter 19 must contain an input stage F2 which has a complementary configuration to that of the input stage F1. In the input stage F2, the parallel circuit consists of a capacitor C and the series-connected resistors R3 and R2, between which a capacitor $C_A$ is connected which goes to the emitter of an amplifier stage $V_D$ which is dimensioned essentially identically to the stage $V_P$.

As shown, the all-pass filter 12 can advantageously follow the clamping stage 11 but it should precede the pre-emphasis filter 13. Such all-pass filters 12 consist of at least one parallel-connected LC section and an ohmic resistance Rd; in general they contain a plurality of parallel LC sections as can be seen, for example, from FIG. 6. An all-pass filter can also consist of two or more parallel LC sections and series LC circuits which connect the inputs and outputs of the former crosswise, that is to say, it consists at least of a so-called X-circuit. In FIG. 6, the equalizer arrangement (all-pass filter) contains a substantially symmetrical transistor stage $T_A$ and the reactance/impedance bridge between emitter and collector, which is connected to the emitter. This bridge consists of the three series-connected parallel sections $L_a \| C_a$, $L_b \| C_b$ and $L_c \| C_c$ (" $\|$ " denotes parallel section), and of the ohmic resistor Rd which is connected to the collector via a coupling capacitor. To level out the amplitude/frequency response, the emitter resistor RE can advantageously be bridged by another series RC circuit.

If the pre-emphasis filter 13 according to FIG. 5 and the all-pass filter 12 according to FIG. 6 are connected together in a suitably matched manner, the transfer characteristic according to FIG. 3 is obtained for a black/white transition according to FIG. 2a, and the amplitude characteristic according to FIG. 4a and the group delay characteristic according to FIG. 4b are also obtained.

The circuit in FIG. 7 shows the de-emphasis filter 19 which substantially corresponds to the circuit in FIG. 5, with the exception of the input stage F2 in FIG. 7. In principle, the equalization stage, namely the all-pass filter 18, in playback channel WK, also corresponds to the all-pass filter 12 in FIG. 6, with the exception of a further parallel section $C_e \| L_e$, in a dashed box, which must be connected after the last section $C_c \| L_c$.

In the case of the all-pass filter 12, $R_d$ is of course connected to the output of the section $C_c \| L_c$. However, the capacitance and inductance values of the CL section in the all-pass filter 18 are different from those in the stage 12. The number of reactance sections depends on the desired approximation of the waviness of the curve to the curve B in FIG. 4. The sections are suitably dimensioned in dependence on the abovementioned characteristics of such circuits and on the frequency characteristics of the recording/playback system used. Commercially available capacitors and coils may be used.

In FIGS. 4b and 4d it can be clearly seen that the equalizing stages must be designed differently for pre-emphasis and for de-emphasis, with respect to group-delay equalization. In the case of pre-emphasis (FIG. 4b), the value of the group delay constants is set to, for example, $\tau\text{grp} = 1$ $\mu$sec. and in the case of de-emphasis (FIG. 4a) to, for example, $\tau\text{grd} = 1.5$ $\mu$sec. In the case described, the low-pass filters 10 and 20 are, as far as their group-delay equalization is concerned, included in the all-pass filters 12 and 18.

An arrangement corresponding to the circuit described was compared, in a test, with a conventional arrangement without group-delay equalization. The result obtained under conditions encountered in practice confirmed the theoretically expected improvement, in the signal/noise ratio, of more than 4.0 db. The increased circuitry required for the all-pass filters is substantially compensated for by the fact that the delay means which were hitherto necessary for matching the differing group delays between the chrominance and the luminance channels, can be omitted since this operation is also taken over by the all-pass filters.

In practice, the resolution of the reproduced video signal was improved from 1.3 to 1.5 times with respect to the rise time of a black/white transition. At 3 MHz the resolution improved to twice its original value.

I claim:

1. An arrangement for equalizing a video signal in a system in which the video signal is recorded in frequency modulated form and then played back upon frequency demodulation,
    wherein, in addition to a pre-emphasis circuit with an emphasizing factor in the recording channel, and similarly in addition to a de-emphasis circuit in the playback channel, a group-delay equalization circuit for the video signal is provided
    such that in a curve representing the frequency response on the output side of the frequency modulator, overshoot spikes of opposite polarity are simultaneously and substantially symmetrically produced for a black/white transition as well as a white/black transition, of the incoming video signal and such that, in light of the attendant reduction in overshoot, the emphasizing factor is increased until the overshoot limits represented by the maximum and minimum permissible frequencies of the system have been reached.

2. An arrangement for equalizing a video signal in a system in which the video signal is recorded in frequency modulated form and then played back upon frequency demodulation, wherein, in addition to a pre-emphasis circuit with an emphasizing factor $\ddot{U}_G$ in the recording channel, and similarly in addition to a de-emphasis cirucit in the playback channel, a group-delay equalization circuit for the video signal is provided such that in a curve representing the frequency response on the output side of the frequency modulator, overshoot spikes of opposite polarity are simultaneously and substantially symmetrically produced for a black/white transition as well as a white/black transition, of the incoming video signal and that the emphasizing factor $\ddot{U}_G$ of the pre-emphasis circuit is increased and follows the equation:

$$\ddot{U}_G = 2\ddot{U} - 1$$

where $\ddot{U}$ is the emphasizing factor of the pre-emphasis circuit without supplementation by the group delay equalization circuit and $\ddot{U}$ is determined by the fraction $\ddot{U} = (f_2/f_1)$ of the cut-off frequencies $f_2$ and $f_1$ of the pre-emphasis circuit.

* * * * *